June 9, 1931.  H. E. HALLENBECK  1,808,954
GUIDING MEANS FOR TROLLEY BUCKETS
Filed Oct. 9, 1930  2 Sheets-Sheet 1

INVENTOR
H.E.Hallenbeck
BY
Siggers & Adams
ATTORNEYS

June 9, 1931. H. E. HALLENBECK 1,808,954
GUIDING MEANS FOR TROLLEY BUCKETS
Filed Oct. 9, 1930   2 Sheets-Sheet 2
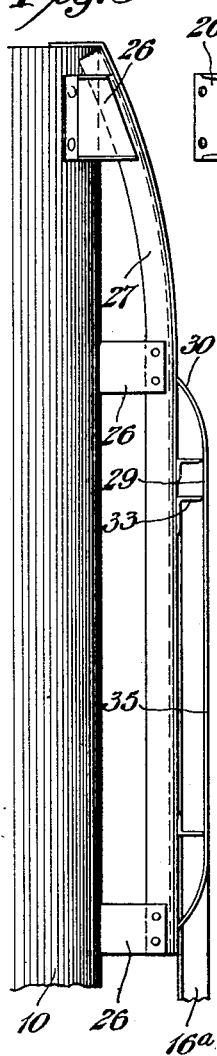
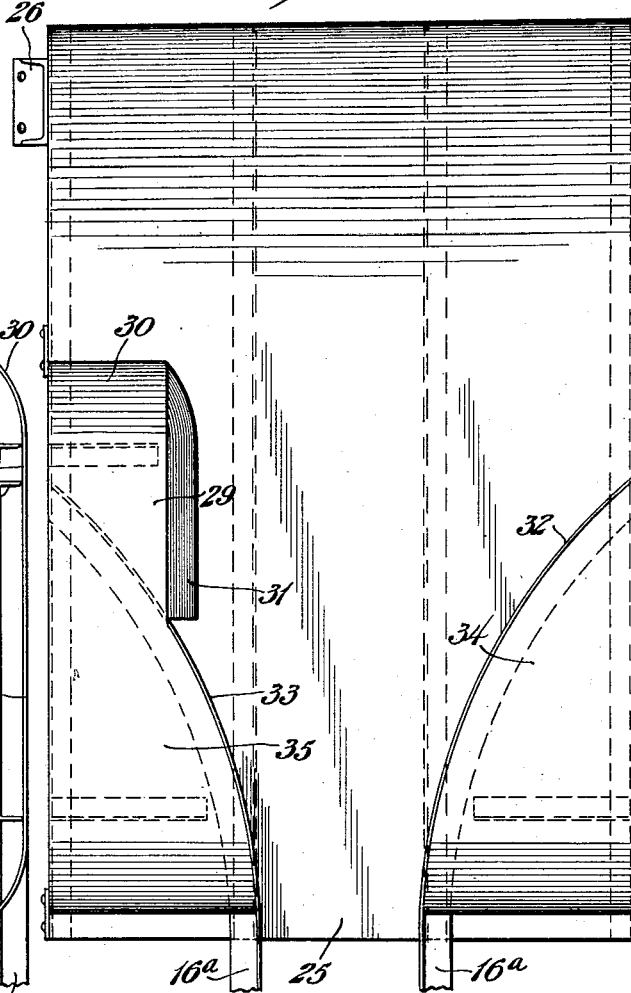
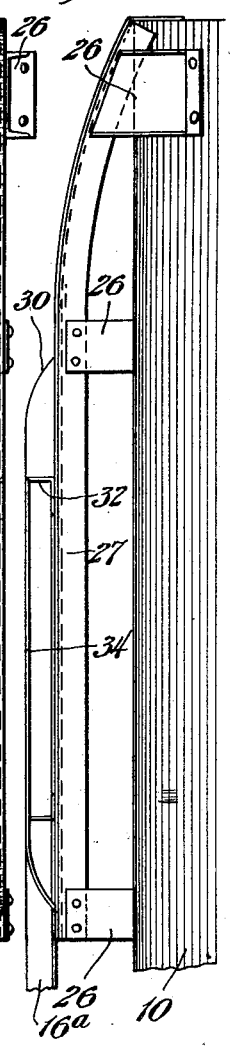
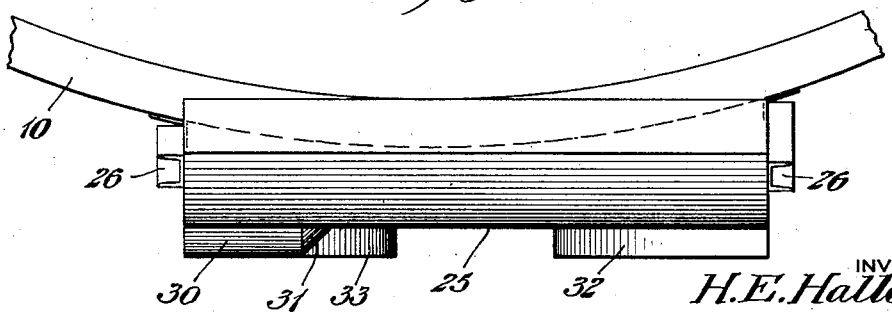
INVENTOR
H.E. Hallenbeck
BY
Siggers & Adams
ATTORNEYS Patented June 9, 1931

1,808,954

UNITED STATES PATENT OFFICE

HAROLD E. HALLENBECK, OF HUDSON, NEW YORK, ASSIGNOR TO GIFFORD-WOOD COMPANY, OF HUDSON, NEW YORK, A CORPORATION OF NEW YORK

GUIDING MEANS FOR TROLLEY BUCKETS

Application filed October 9, 1930. Serial No. 487,627.

This invention relates to guiding means for trolley buckets, and among other objects, aims to provide improved guiding means especially adapted to cooperate with a bucket of the construction disclosed in the A. C. Bennett Patent No. 1,791,882, dated February 10, 1931 (assigned to the assignee of this application).

In the accompanying drawings forming a part of this specification and showing a preferred embodiment of the invention:—

Fig. 2 is an elevation, on an enlarged scale, of one of the guiding means for the trolley bucket;

Fig. 3 is an end elevation looking at the left end of the guiding means of Fig. 2, showing also part of the bin to which the guiding means is attached;

Fig. 4 is an end elevation looking from the right end of the guiding means of Fig. 2, showing also a part of the bin; and Fig. 5 is a top plan of the same, showing also a part of the bin.

Figure 1:
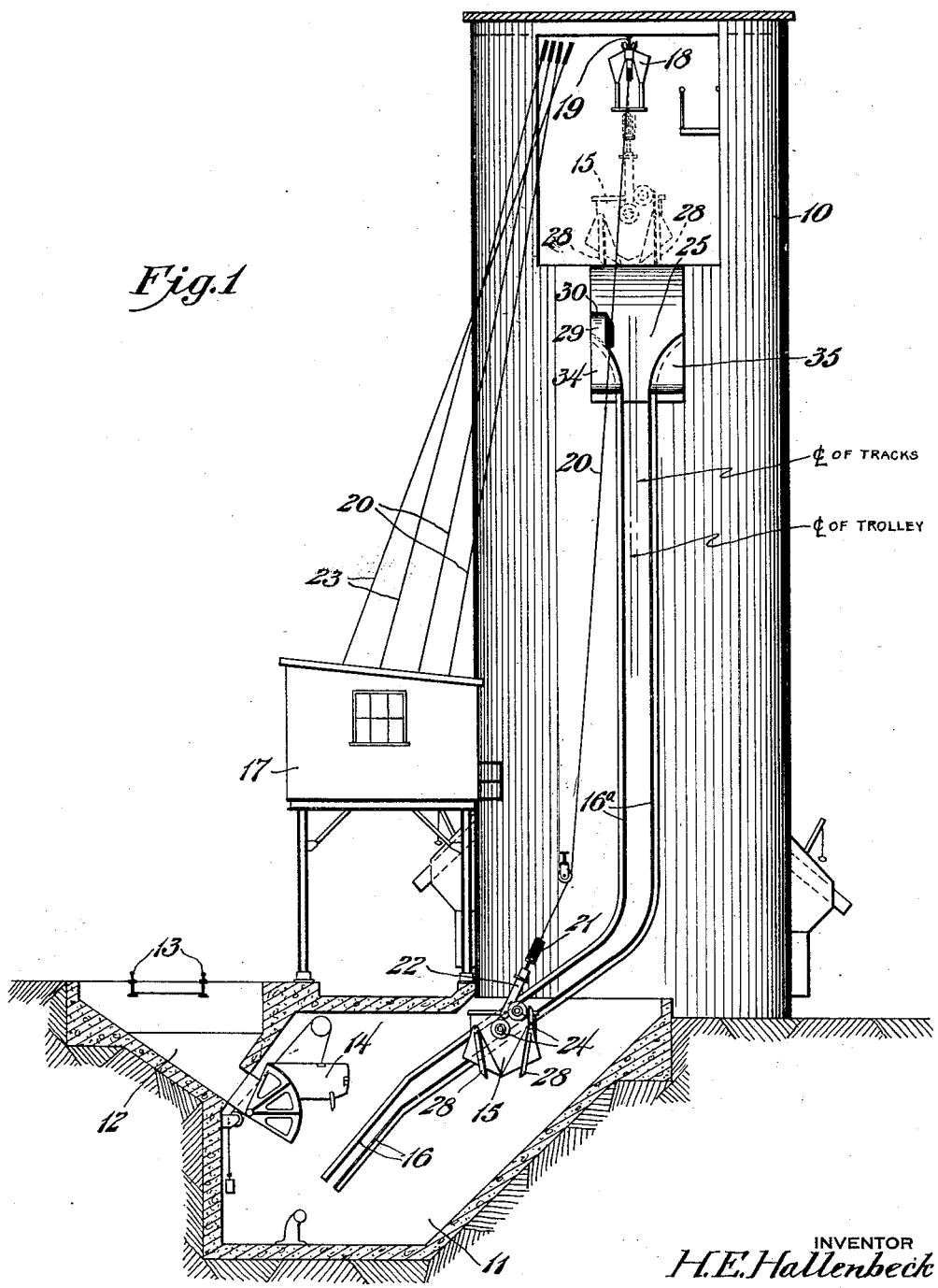
Fig. 1 is a vertical section through a plant having the improvement, showing the bucket in full lines as when being hoisted out of the pit and in dotted lines as when being lowered to the guiding means.

Referring to Fig. 1, there is shown so much of a materials handling plant as is necessary for an understanding of the invention. The illustrative plant is for handling and storing materials such as coal, sand, gravel and the like, and comprises a bin or silo 10, a pit 11, a hopper 12 beneath a railroad track 13, a combined gate and chute 14 to control the flow of material from the hopper, a trolley bucket 15, tracks 16 for guiding and holding the bucket, and a machinery house 17 in which are housed the electric motors and drums (not shown) and their control mechanisms.

As shown in the copending application of W. H. Towne, Serial No. 146,890, filed November 8, 1926 (assigned to the assignee of this application), the bin or silo 10 is but one of a series over which the bucket 15 travels, the bucket being suspended from a trolley 18 which runs along a monorail 19. A hoist line 20 supports the bucket through a sheave 21 on the bucket bail 22, and the hoist line is wrapped around the hoist drum and is dead-ended at the opposite end (not here shown) so that winding up the hoist line elevates the bucket, and paying it out lowers the bucket. The trolley 18 is pulled along the monorail by means of a trolley or traverse line 23 which also is wound around a motor driven drum and has its ends secured to the opposite ends of the trolley so that rotation of said drum in opposite directions effects traverse of the trolley, and hence of the bucket, in opposite directions.

By the described construction, it will be clear, the bucket may be raised and lowered at any point along the monorail, and may be made to travel for any distance less than the full length of the monorail. The electrical motors and their controls for effecting automatic or hand-controlled hoisting and traversing of the bucket are fully described and claimed in a companion application, Serial No. 491,534, filed October 27, 1930, and hence are not shown here.

As the bucket must have a certain position relative to the gate 14 to insure clean loading of the bucket in the pit, it follows that the bucket must be guided while in the pit; and as the bucket is suspended from the trolley by means of the hoist line, which, being flexible, is incapable of resisting side swaying and twisting and turning of the bucket, there is a great advantage in continuing the tracks 16 nearly to the tops of the two bins between which the bucket travels on its way to and from the pit. Therefore, the tracks 16 extend above the mouth of the pit and include vertical or nearly vertical guide portions 16ª. The bucket 15 has rollers 24 preferably arranged in pairs on opposite sides, as shown in the aforesaid A. C. Bennett patent, and the two rollers 24 are located at such an angle with respect to the vertical that they hold the top of the bucket horizontal when the bucket is in the lowermost position in the pit. Thus, the two rollers on each side of the bucket are designed to contact with the surfaces of the two guides which together form a track, as shown in Fig. 1 (and also as shown in said A. C. Bennett patent); and said guides are so spaced throughout their length that the two rollers on each side of the bucket will practically always be in contact with their guides so that the bucket cannot swing on the pivots of the bail 22 to dump part of its load, and also preventing swinging, swaying and twisting of the bucket on the hoist cable. However, it is within the scope of the present invention to employ a bucket having but two guide rollers, one on each side.

When the empty bucket returns from one of the bins and reaches a point directly over the tracks 16ª, it is brought to a stop and lowering commences. According to the invention, the bucket is so guided as it is lowered that its rollers will surely engage the substantially vertical portions 16ª of the tracks 16. To insure this desirable result, bucket guiding means are provided at the tops of the vertical tracks 16ª. The novel bucket guiding means are best shown in Figs. 2 to 5 inclusive, to which reference should now be made.

Mounted upon two of the bins 10 (or upon any other convenient support) is a bucket guide consisting of two spaced, substantially vertical steel plates 25, each outwardly curved or flared at the upper end, as best shown in Figs. 3 and 4. Each plate 25 is secured to the corresponding bin as by means of feet 26 riveted or otherwise secured to the marginal flanges 27, such flanges extending vertically along the longitudinal edges of each plate 25. The two plates 25 together provide the primary guiding means for the bucket, which descends between them on its way to engagement with the tracks 16ª.

As the bucket descends, the guide shoes or fenders 28 on the bucket (Fig. 1) strike the plates 25 and straighten out the bucket, that is, cause the roller-bearing sides of the bucket to become substantially parallel to the vertical portions of plates 25. To make the guiding more perfect, I provide a pad 29 on each plate 25 about halfway between the upper and lower ends, and on the side which is nearer the pit, said pad 29 having a curved surface 30 at its top and an inwardly bent surface 31 extending longitudinally thereof and joining it with the plate 25. Each pad 29 is flush with the outer edge of plate 25, as shown in Figs. 1 and 2. The purpose of the pads 29 is to engage with the outer or left-hand shoes or fenders 28 as the bucket descends. The two opposite pads 29 are so spaced that the fenders 28 have only a one-half inch clearance on each side of the bucket, that is to say, if the bucket is perfectly alined and stationary, there will be a one-half inch space on each side between the outermost edge of a fender 28 and the vertical surface of the adjacent pad 29. The curved surfaces 30 and 31 guide the ends of the outer fenders 28 so that said fenders will come in contact with the vertical surface of the corresponding pad 29 and will slide along such surface so as to straighten out the bucket as it descends. As one of the outer fenders hits pad 29, the diagonally opposite inner fender 28 strikes plate 25 at some point.

When the fenders 28 have straightened the bucket, its rollers will automatically engage the tracks 16ª because, as shown in Fig. 2, said tracks are extended upwardly into engagement with the plates 25 and present outwardly and upwardly curved portions 32 and 33 respectively, the guide 33 merging with the pad 29 and hence having the same depth or thickness as the pad 29 (see Fig. 5). The guide 32 on the other hand extends in a continuous curve to the longitudinal and vertical edge of the plate 25, as best shown in Figs. 2 and 5. The spaces between the guides 32 and 33 and the vertical edges of the plates 25 are closed by means of filler plates 34 and 35 respectively. These filler plates make it impossible for the rollers or any other projecting portion of the bucket to engage under the guides 32 and 33, which would prevent proper engagement of the bucket rollers with the tracks.

Referring to Fig. 1, it will be observed that the center line of the tracks 16ª is not alined with the center line of the trolley. This is to insure engagement of the two outer fenders 28 with the pads 29 and also to insure engagement of the rollers 24 with the guiding surfaces of tracks 16ª. The center line of the trolley passes through the central rollers 24 and obviously these should engage the outer guides of tracks 16ª, while the upper rollers 24 should engage the inner guides.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In combination, a bucket having rollers on opposite sides; a pair of upwardly extending tracks upon which the bucket rollers on each side travel; a pair of substantially vertical guide plates secured to the upper ends of the tracks; the bucket also having downwardly projecting fenders on each side; and means on the guide plates adapted to be engaged by said fenders to straighten the bucket as it descends, so that the rollers may properly engage the tracks.

2. In combination, a bucket having rollers on opposite sides; a pair of upwardly extending tracks upon which the rollers on each side travel; a pair of substantially vertical guide plates secured to the upper ends of the tracks and having outwardly flared upper ends; the bucket also having downwardly projecting fenders on each side; and pads secured to the opposed guide plates near one longitudinal edge thereof and projecting inwardly, said pads being adapted to be engaged by said fenders to straighten the bucket as it descends, so that the rollers may properly engage the tracks.

3. In combination, a bucket having a pair of rollers on each side; a pair of upwardly extending tracks, each track consisting of two guides between which the rollers on each side travel; a pair of substantially vertical guide plates secured to the upper ends of the tracks; the bucket also having downwardly projecting fenders on each side; means on the guide plates adapted to be engaged by said fenders to straighten the bucket as it descends, so that the rollers may properly engage the tracks; the two guides forming each track being curved upwardly and outwardly on the respective guide plates; and means filling the spaces between the guiding edges of said guides and the outer vertical edges of said plates to prevent any part of the bucket from catching under the guides.

4. In combination, a bucket having a pair of rollers on each side; a pair of upwardly extending tracks, each track consisting of two guides between which the rollers on each side travel; a pair of substantially vertical guide plates secured to the upper ends of the tracks; the bucket also having downwardly projecting fenders on each side; means on the guide plates adapted to be engaged by said fenders to straighten the bucket as it descends, so that the rollers may properly engage the tracks; the two guides forming each track being curved upwardly and outwardly on the respective guide plates; two of the guides being merged with the pads on the guide plates and the other two guides extending to the longitudinal edges of the corresponding guide plates; the two guides being spaced apart at the lower end of the plate a distance about equal to the greatest distance between the rollers so that both rollers may substantially engage with the guides when the bucket has been lowered to that point.

5. Guiding means for trolley buckets comprising, in combination, a substantially vertical plate; a pad secured to the exposed face of the plate about half way between its upper and lower ends and adjacent a longitudinal vertical edge thereof; and means for merging the pad with the surface of the plate so that no part of the bucket may catch on said pad either in hoisting or in lowering.

6. Guiding means for trolley buckets comprising, in combination, a substantially vertical plate; a pad secured to the exposed face of the plate about half way between its upper and lower ends and adjacent a longitudinal vertical edge thereof; means for merging the pad with the surface of the plate so that no part of the bucket may catch on said pad either in hoisting or in lowering; and upwardly and outwardly curved guides spaced from each other and extending from the lower end of the plate to the pad on one side and the longitudinal, vertical edge of the plate on the other side.

7. Guiding means for trolley buckets comprising, in combination, a substantially vertical plate; a pad secured to the exposed face of the plate about half way between its upper and lower ends and adjacent a longitudinal vertical edge thereof; means for merging the pad with the surface of the plate so that no part of the bucket may catch on said pad either in hoisting or in lowering; upwardly and outwardly curved guides spaced from each other and extending from the lower end of the plate to the pad on one side and the longitudinal vertical edge of the plate of the other side; and means filling the spaces between the guides and the vertical edges of said plate to prevent any part of the bucket from catching under the guides.

In testimony that I claim the foregoing as my own, I have hereto affixed my signature.

HAROLD E. HALLENBECK.